(12) United States Patent
Hozumi et al.

(10) Patent No.: US 9,238,552 B2
(45) Date of Patent: Jan. 19, 2016

(54) BELT TRACKING SYSTEM, ROLLER ASSEMBLY, AND IMAGE FORMING APPARATUS INCLUDING SAME

(71) Applicants: Yoshiki Hozumi, Kanagawa (JP); Naomi Sugimoto, Kanagawa (JP); Yuuji Sawai, Kanagawa (JP); Kazuchika Saeki, Kanagawa (JP)

(72) Inventors: Yoshiki Hozumi, Kanagawa (JP); Naomi Sugimoto, Kanagawa (JP); Yuuji Sawai, Kanagawa (JP); Kazuchika Saeki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/090,091

(22) Filed: Nov. 26, 2013

(65) Prior Publication Data

US 2014/0183007 A1    Jul. 3, 2014

(30) Foreign Application Priority Data

Dec. 28, 2012 (JP) .................. 2012-287833
Sep. 27, 2013 (JP) .................. 2013-200864

(51) Int. Cl.
*B65G 39/16* (2006.01)
*B65G 15/64* (2006.01)
*B65G 23/44* (2006.01)
*G03G 15/16* (2006.01)

(52) U.S. Cl.
CPC ............... *B65G 39/16* (2013.01); *B65G 15/64* (2013.01); *B65G 23/44* (2013.01); *G03G 15/1615* (2013.01); *G03G 2215/00143* (2013.01)

(58) Field of Classification Search
CPC ...... B65G 39/16; B65G 39/071; B65G 23/44; B65G 15/64; G03G 15/1615; G03G 2215/00143–2215/00168

USPC ............. 198/806, 807, 810.03; 399/165, 329
See application file for complete search history.

(56) References Cited

U.S. PATENT DOCUMENTS

| | | | | |
|---|---|---|---|---|
| 7,810,633 B2* | 10/2010 | Okamoto | ............. | G03G 15/755 198/806 |
| 7,986,903 B2* | 7/2011 | Park | ..................... | G03G 15/161 399/121 |
| 8,165,511 B2* | 4/2012 | Nakamura | ........... | G03G 15/161 198/806 |

(Continued)

FOREIGN PATENT DOCUMENTS

| JP | 2007-047702 A | 2/2007 |
|---|---|---|
| JP | 2009-186910 | 8/2009 |

(Continued)

OTHER PUBLICATIONS

U.S. Appl. No. 14/140,097, filed Dec. 24, 2013, Hozumi, et al.

(Continued)

*Primary Examiner* — Leslie A Nicholson, III
*Assistant Examiner* — Keith R Campbell
(74) *Attorney, Agent, or Firm* — Oblon, McClelland, Maier & Neustadt, L.L.P.

(57) ABSTRACT

A belt tracking system for adjusting misalignment of a movable belt in an axial direction of a plurality of rollers about which the movable belt is entrained includes a slope member and a stationary shaft guide. The slope member is disposed at both ends of at least one of the plurality of rollers in the axial direction, to tilt the roller as the belt moves in the axial direction. The stationary shaft guide contacts the slope member. A distance between a contact point of the slope member that contacts the stationary shaft guide and an end portion of the slope member in the axial direction is longer than a maximum traveling distance that the slope member travels in the axial direction.

12 Claims, 13 Drawing Sheets

(56) References Cited

U.S. PATENT DOCUMENTS

| | | | |
|---|---|---|---|
| 8,657,104 B2* | 2/2014 | Asaoka | B65G 15/64 198/806 |
| 8,792,812 B2* | 7/2014 | Fujioka | G03G 15/0194 399/165 |
| 8,944,243 B2* | 2/2015 | Hozumi | B65G 15/60 198/806 |
| 2013/0306440 A1* | 11/2013 | Asaoka | B65G 15/64 198/806 |
| 2014/0083821 A1* | 3/2014 | Hozumi | G03G 15/1615 198/806 |

FOREIGN PATENT DOCUMENTS

| | | |
|---|---|---|
| JP | 2009-288426 | 12/2009 |
| JP | 2010-019899 | 1/2010 |
| JP | 2010-230958 | 10/2010 |
| JP | 2011-008023 A | 1/2011 |

OTHER PUBLICATIONS

U.S. Appl. No. 14/140,097, filed Dec. 24, 2013.
U.S. Appl. No. 13/960,098, filed Aug. 6, 2013, Yoshiki Hozumi, et al.
U.S. Appl. No. 13/869,286, filed Apr. 24, 2013.
U.S. Appl. No. 13/898,728, filed May 21, 2013.
U.S. Appl. No. 13/859,192, filed Apr. 9, 2013.
U.S. Appl. No. 13/859,118, filed Apr. 9, 2013.
Japanese Office Action issued on Mar. 6, 2015, in JP Patent Application No. 2013-200864.

* cited by examiner

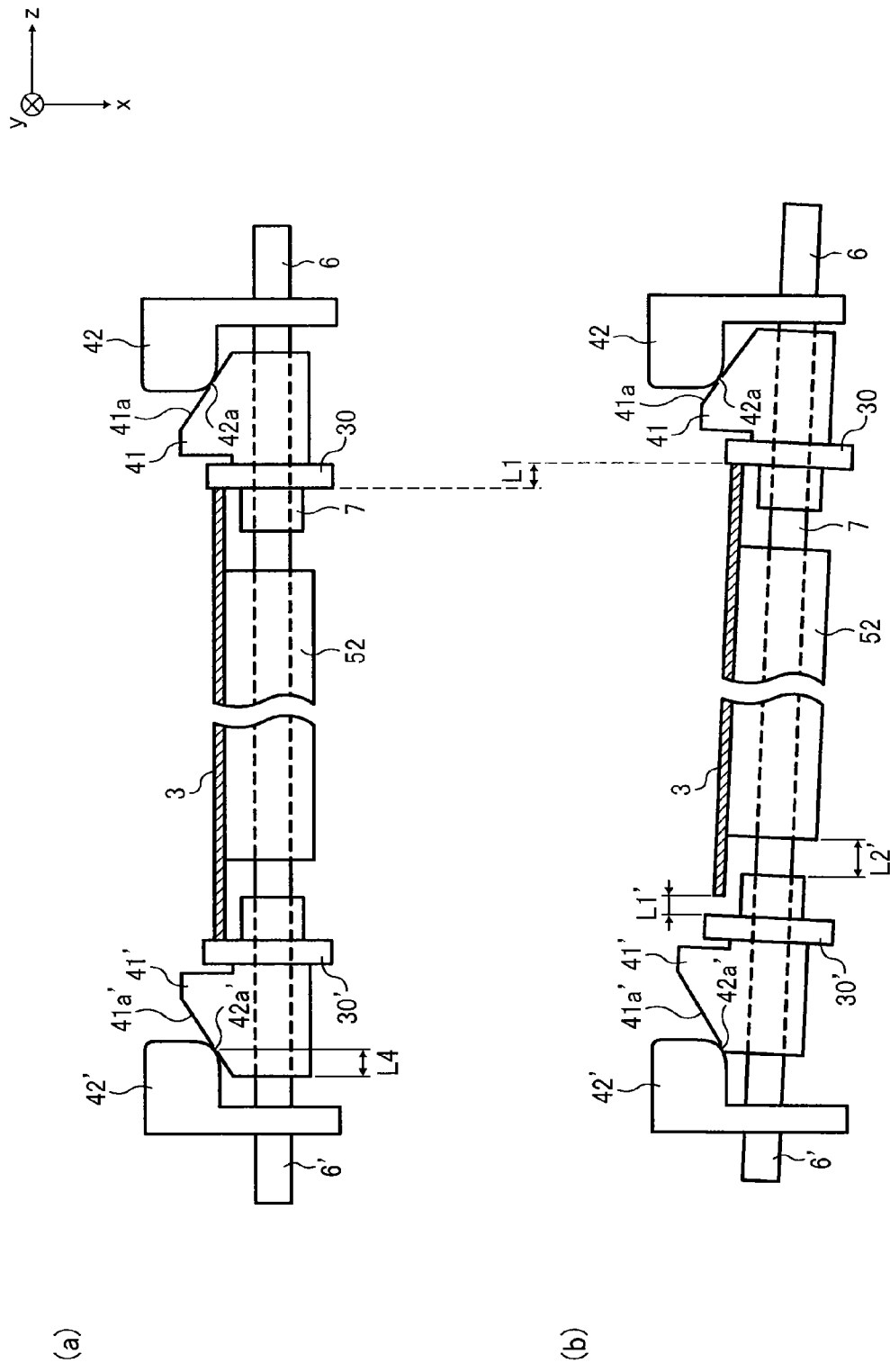

BELT TRACKING SYSTEM, ROLLER ASSEMBLY, AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application Nos. 2012-287833, filed on Dec. 28, 2012, and 2013-200864, filed on Sep. 27, 2013, both in the Japan Patent Office, which are hereby incorporated herein by reference in their entirety.

BACKGROUND

1. Technical Field

Exemplary aspects of the present disclosure generally relate to a belt tracking system, a roller assembly, and an image forming apparatus employing the same, and more particularly, to a belt tracking system for adjusting misalignment of a movable belt in an axial direction of a plurality of rollers about which the movable belt is entrained, a roller assembly, and an image forming apparatus employing the belt tracking system.

2. Description of the Related Art

Known image forming apparatuses employ various types of movable belts, such as an intermediate transfer belt, a media conveyor belt, and a fixing belt, each of which is entrained about a plurality of generally parallel support rollers and rotated by the rotation of the rollers. Due to wear and tear of parts used to rotate the belt support rollers, the belt support rollers are no longer aligned parallel to each other. Furthermore, because multiple parts are connected, the parts vary from one to another and variation among these parts can cause a different degree of connection at the left end and the right end of the rollers. As a result, the support rollers are not aligned parallel.

When these rollers are no longer parallel, the belt runs over the rollers in the axial direction of the rollers, resulting in breakage of the belt.

To address this difficulty, several techniques have been proposed which employ a belt tracking system to correct the position of the belt which has drifted in the axial direction of the roller. For example, there is known a belt tracking system in which a rotary member with an inclined surface and a stationary guide member are provided to correct displacement of the belt. Such a configuration is proposed in JP-2009-288426-A.

In order to facilitate an understanding of the related art and of the novel features of the present invention, with reference to FIGS. 11A through 11D, a description is provided of the known belt tracking system to correct displacement of the belt proposed in JP-2009-288426-A.

As illustrated in FIG. 11A, the belt tracking system includes a roller 910 about which a sheet conveyor belt 900 is entrained, rotary members 920a and 920b including inclined surfaces 930a and 930b, respectively, and stationary guide members 940a and 940b that contact the inclined surfaces 930a and 930b, respectively. FIG. 11A illustrates the sheet conveyor belt 900 without skew. As illustrated in FIG. 11A, when the sheet conveyor belt 900 is in its proper operational position without skew, the rotary members 920a and 920b at each end of the roller 910 in the axial direction thereof contact the stationary guide members 940a and 940b, respectively.

By contrast, as illustrated in FIG. 11B, when the sheet conveyor belt 900 drifts to one side, the belt edge contacts and presses against one of the rotary members 920a and 920b in the axial direction, causing the pressed rotary member 920a (or 920b) to move in the direction of skew of the belt 900 (in this example, the rotary member 920a is pressed to the right side of the drawing). As a result, as illustrated in FIG. 11B, the inclined surface 930a of the rotary member 920a at one axial end of the roller 910 contacts the stationary guide member 940, causing the roller 910 at that axial end to tilt downward. The end of the roller 910 at the rotary member 920a side tilts downward, thereby moving the sheet conveyor belt 900 in a direction opposite the direction of skew and hence correcting the position of the sheet conveyor belt 900.

Although generally advantageous, when the roller 910 in the state shown in FIG. 11B moves toward the rotary member 920a, the other rotary member, i.e., the rotary member 920b moves in the same direction. At this time, the inclined surface 930b of the rotary member 920b at the opposed end of the rotary member 920a separates from the stationary guide member 940b such as shown in FIG. 11C, hindering proper rotation of the roller 910.

If the sheet conveyor belt 900 moves to the rotary member 920b as illustrated in FIG. 11D after the inclined surface 930b of the rotary member 920b separates from the stationary guide member 940b, the end of the roller 910 at the rotary member 920b side needs to tilt downward in order to correct the position of the sheet conveyor belt 900.

However, since the inclined surface 930b is not in contact with the stationary guide member 940b, the end of the roller 910 at the rotary member 920b side cannot tilt downward, thereby complicating efforts to correct the position of the sheet conveyor belt 900.

SUMMARY

In view of the foregoing, in an aspect of this disclosure, there is provided a novel belt tracking system for adjusting misalignment of a movable belt in an axial direction of a plurality of rollers about which the movable belt is entrained. The belt tracking system includes a slope member and a stationary shaft guide. The slope member is disposed at both ends of at least one of the plurality of rollers in the axial direction, to tilt the roller as the belt moves in the axial direction. The stationary shaft guide contacts the slope member. A distance between a contact point of the slope member that contacts the stationary shaft guide and an end portion of the slope member in the axial direction is longer than a maximum traveling distance that the slope member travels in the axial direction.

According to another aspect, a belt tracking system for adjusting misalignment of a movable belt in an axial direction of a plurality of rollers about which the movable belt is entrained includes a slope member, a stationary shaft guide, and a gap. The slope member is disposed at both ends of at least one of the plurality of rollers in the axial direction, to tilt the roller as the belt moves in the axial direction. The stationary shaft guide contacts the slope member. The gap is disposed between the roller and the slope member. A distance between a contact point of the slope member that contacts the stationary shaft guide and an end portion of the slope member in the axial direction is greater than a length of the gap.

According to still another aspect, a roller assembly for supporting a movable belt includes a plurality of rollers, a slope member, and a stationary shaft guide. The plurality of rollers about which the movable belt is entrained rotates the movable belt in a direction perpendicular to an axial direction of the plurality of rollers. The slope member is disposed at both ends of at least one of the plurality of rollers in the axial direction, to tilt the roller as the belt moves in the axial direction. The stationary shaft guide contacts the slope member. A distance between a contact point of the slope member that contacts the stationary shaft guide and an end portion of the slope member in the axial direction is longer than a maximum traveling distance that the slope member travels in the axial direction.

According to still another aspect, an image forming apparatus at least one of the belt tracking system and the roller assembly.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein:

FIGS. 8 (a) and 8 (b) are schematic diagrams illustrating another example of the belt tracking system;

DETAILED DESCRIPTION

Figure 1:
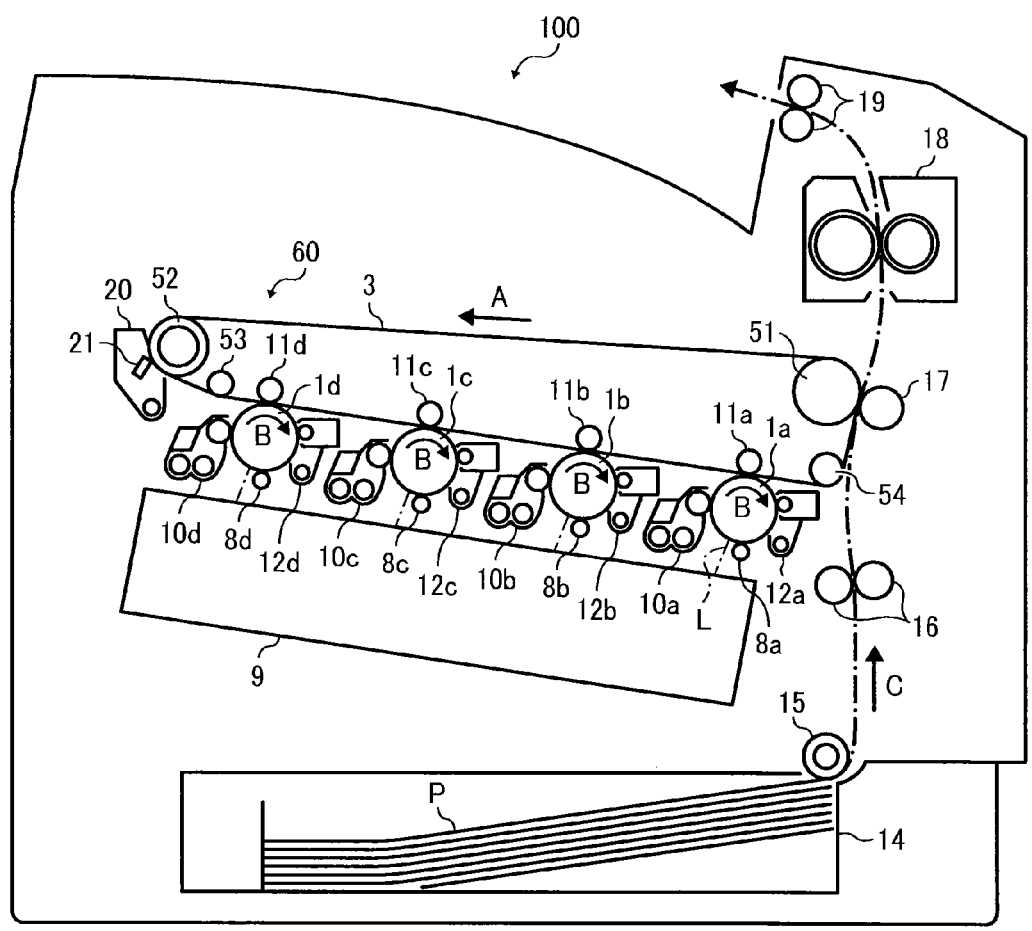
FIG. 1 is a schematic diagram illustrating an image forming apparatus according to an illustrative embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

With reference to FIG. 1, a description is provided of an image forming apparatus 100 according to an illustrative embodiment of the present disclosure. FIG. 1 is a schematic diagram illustrating a printer as an example of the image forming apparatus 100.

As shown in FIG. 1, an image forming apparatus 100 includes a tandem color printer that employs four imaging stations, including first through fourth photosensitive drums 1a, 1b, 1c, and 1d arranged in tandem, for forming toner images with four different colors: black, magenta, cyan, and yellow. Since the imaging stations have the same configuration as all the others differing in the color of toner used for image formation, features of the photosensitive member and its associated imaging equipment described herein apply to all the imaging stations unless otherwise indicated. Also included in the image forming apparatus 100 is an intermediate transfer device 60 including an intermediate transfer belt 3 disposed opposite and in contact with the photosensitive members 1a, 1b, 1c, and 1d. The intermediate transfer belt 3 is entrained about a plurality of belt support rollers, including a drive roller 51 and a tension roller 52, as well as support rollers 53 and 54, aligned generally parallel to each other.

As the drive roller 51 driven by a driving source rotates, the intermediate transfer belt 3 rotates in a direction indicated by arrow A in conjunction with the rollers 52, 53, and 54. In the present illustrative embodiment, the intermediate transfer belt 3 comprises a looped belt composed of one or more layers of material. In the case of a single-layer belt, the belt material may be selected from, for example, polyvinylidene difluoride (PVDF), polycarbonate (PC), and polyimide (PI). In the case of a multi-layered belt, the belt may be formed of a relatively inelastic fluorine resin such as PVDF and polyimide resin, with a smooth coating of fluorine resin deposited on the substrate.

The photosensitive members 1a, 1b, 1c, and 1d, and associated imaging equipment to form toner images thereon and to transfer the toner images onto the intermediate transfer belt have the same configuration as all the others, differing only in the color of toner employed. Thus, a description is provided only of the photosensitive member 1a and its associated imaging equipment for forming a toner image of black as an example of the photosensitive members and associated imaging equipment. The second through fourth photosensitive members 1b, 1c, and 1d, and associated imaging equipment are omitted herein, unless otherwise indicated.

The photosensitive member 1a is rotatable in a direction indicated by arrow B, while surrounded by various pieces of imaging equipment, including a charge neutralizer, a charging device 8a, a development device 10a, and a cleaning device 12a. While the photosensitive member 1a is rotated in the direction of arrow B, light from the charge neutralizer illuminates the surface of the photosensitive member 1a, thereby initializing the surface potential of the photosensitive member 1a. The charging device 8a is disposed near the photosensitive member 1a and charges uniformly the surface of the photosensitive member 1a after the surface potential of the photosensitive member 1a is initialized to a negative polarity. Subsequently, an exposure device 9 illuminates the photosensitive surface with a laser beam L, thereby forming an electrostatic latent image on the surface of the photosensitive member 1a.

The developing device 10a develops the electrostatic latent image formed on the photosensitive drum 10a with black toner, thereby developing the electrostatic latent image into a visible image, known as a toner image of black. Four primary transfer rollers 11a, 11b, 11c, and 11d are disposed opposite the photosensitive members 1a, 1b, 1c, and 1d, respectively, via the intermediate transfer belt 3 to form four primary transfer nips therebetween, through each of which the toner image is primarily transferred from the photosensitive member 1 to the intermediate transfer belt 3.

At the primary transfer nip, the primary transfer roller 11a is supplied with a bias voltage (transfer voltage) of a polarity opposite that of the toner on the photosensitive member 1 (for example, a transfer voltage having a positive polarity where the charged toner has a negative polarity), thereby forming a transfer electric field between the photosensitive member 1a and the intermediate transfer belt 3. This electrostatically transfers the toner image from the photosensitive surface to an outer surface of the intermediate transfer belt 3 which rotates in sync with the movement of the photosensitive member 1a in a process known as primary transfer. After the primary transfer, the surface of the photosensitive member 1a enters the cleaning device 12a to remove residual toner remaining on the surface of the photosensitive member 1a.

Similarly, toner images of magenta, cyan, and yellow are formed on the second through fourth photosensitive members 1b through 1d. Subsequently, the toner images are transferred electrostatically onto the black toner image which has been transferred on the intermediate transfer belt 3 such that they are superimposed one atop the other to form a composite toner image on the surface of the intermediate transfer belt 3.

A sheet tray 14 accommodating a stack of recording sheets P is disposed at the bottom of the image forming apparatus 100. A feed roller 15 is disposed at an outlet of the sheet tray 14 to advance the recording sheet P in a direction indicated by arrow C into a sheet conveyance path defined by a suitable sheet conveyance device, including, for example, a movable belt entrained around a plurality of belt support rollers.

Along the sheet conveyance path is a pair of registration rollers 16 for introducing the recording sheet P into a secondary transfer nip between a secondary transfer roller 17 and the outer surface of the intermediate transfer belt 3. The secondary transfer roller 17 is disposed opposite the drive roller 51 via the intermediate transfer belt 3 to form the secondary transfer nip therebetween, through which the toner image is secondarily transferred from the intermediate transfer belt 3 to a recording sheet P. The secondary transfer roller 17 is supplied with a bias voltage (i.e., secondary transfer voltage) to transfer secondarily the toner image from the intermediate transfer belt 3 onto the recording sheet P.

A fixing device 18 is disposed downstream from the secondary transfer nip to fix the toner image on the recording sheet P with heat and pressure applied thereto. Thereafter, the recording sheet P is output by a pair of output rollers 19 for stacking the recording sheet P outside the apparatus body. A belt cleaning device 20 removes residual toner remaining on the intermediate transfer belt 3 after secondary transfer of the toner image. In the present illustrative embodiment, the belt cleaning device 20 includes a cleaning blade 21 of suitable material, such as urethane, held against the intermediate transfer belt 3 to mechanically remove or scrape toner residues from the belt surface.

Alternatively, instead of or in combination with a cleaning blade, any suitable cleaning device may be used to clean the intermediate transfer belt 3, including, for example, an electrostatic cleaning device that incorporates an electrically conductive fur brush for electrostatically removing toner residues from the belt surface.

A description is now given of a belt tracking system 50 employed in the image forming apparatus 100 according to an illustrative embodiment of the present disclosure. According to the present illustrative embodiment, the belt tacking system 50 is provided to at least one of the plurality of rollers employed in the image forming apparatus 100 shown in FIG. 1. In the following example, the belt tracking system 50 is provided, for example, to the tension roller 52. However, unless otherwise specified, the belt tracking system 50 can be applied to at least one of the drive roller 51, and the support rollers 53 and 54.

Figure 2A:
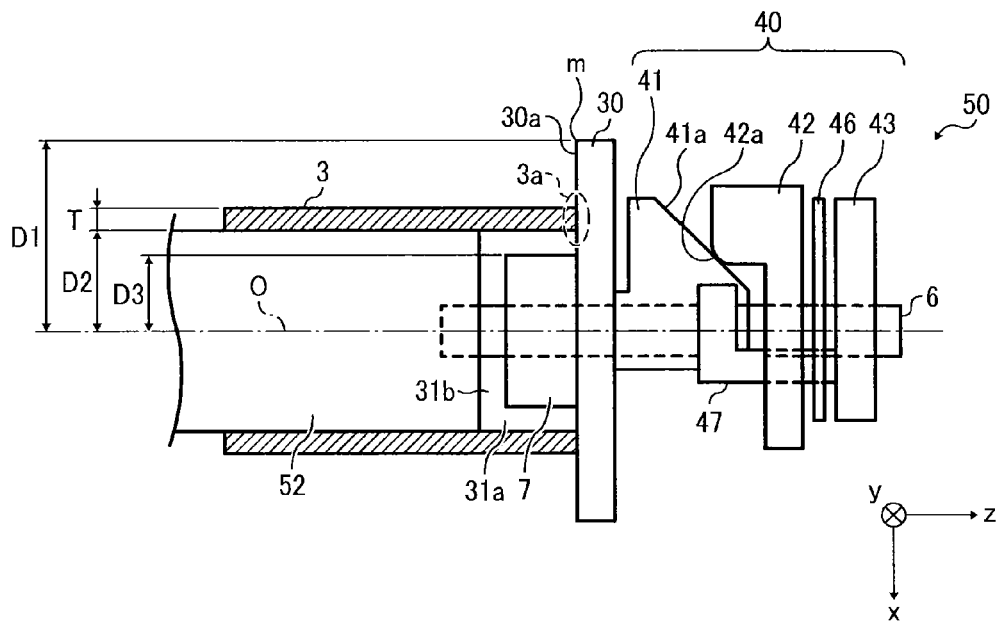
FIGS. 2A and 2B are cross-sectional views schematically illustrating a belt tracking system according to an illustrative embodiment of the present disclosure.
Figure 2B:
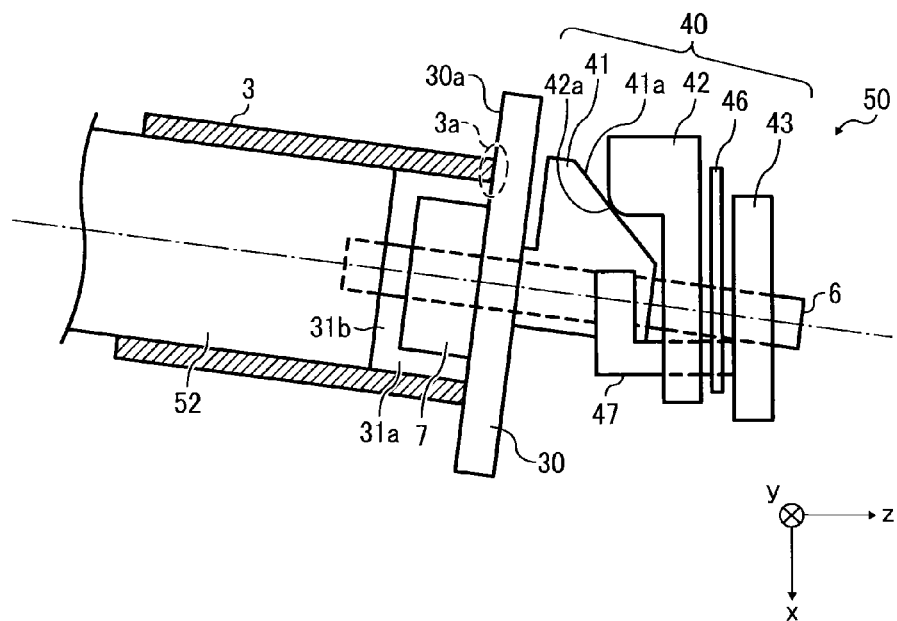

With reference to FIGS. 2A and 2B, a description is provided of the belt tracking system 50. FIGS. 2A and 2B are cross-sectional views of the belt tracking system 50 according to an illustrative embodiment of the present disclosure.

As illustrated in FIG. 2A, the belt tracking system 50 includes a roller shaft 6. In the present illustrative embodiment, the roller shaft 6 includes a cylindrical body with a diameter smaller than that of the tension roller 52. The roller shaft 6 is disposed at the end of the tension roller 52 and is coaxially mounted with the tension roller 52 to integrally rotate with the tension roller 52. The roller shaft 6 penetrates movably through a contact member 30 and a position adjuster 40. More specifically, a slope member 41 of the position adjuster 40 and the contact member 30 can move freely in the axial direction (it may be referred to as "axial direction of the roller") of the tension roller 52 while moving such that the contact member 30 and the slope member 41 are movable together with the roller shaft 6 generally in the direction perpendicular to the axial direction of the roller.

The contact member 30 is provided movably to the end of the tension roller 52 in the axial direction of the roller. The contact member 30 includes a generally planar, flat surface 30a with a circular peripheral shape concentric with the rotational axis of the tension roller 52. The flat surface 30a extends substantially perpendicular to the axial direction of the roller. The flat surface 30a comes into contact with an end portion 3a of the intermediate transfer belt 3 when the intermediate transfer belt 3 moves outward in the axial direction (toward the right side in FIGS. 2A and 2B) from the axial end of the tension roller 52.

As illustrated in FIG. 2A, in order to prevent displacement of the intermediate transfer belt 3 in which the belt end portion 3a contacts the flat surface 30a and the intermediate transfer belt 3 runs over the contact portion 30, slipping off from the tension roller 52, a radius D1 of the circular peripheral shape of the flat surface 30a exceeds a sum of a radius D2 of the tension roller 52 and a thickness T of the intermediate transfer belt 3. For example, when employing the tension roller 52 with the roller radius D2 of 8.78 mm and the belt thickness T of 80 μm, the distance D1 (which is the radius of the circular peripheral shape of the flat surface 30a in the present illustrative embodiment) may be set to a range greater than 8.86 mm, such as approximately 9.00 mm.

Alternatively, as long as the contact member 30 properly serves its intended function, the flat surface 30a includes any generally planar surface, including a curved surface, an irregular surface, or any combination thereof. Further, the peripheral shape of the flat surface 30a includes any closed geometric shape, such as a circle, an ellipse, a rectangle, a polygon, or any combination thereof. The flat surface 30a may be shaped and dimensioned such that the radius D1 between a central, rotational axis O of the tension roller 52 and a periphery M of the flat surface 30a exceeds a sum of the radius D2 of the tension roller 52 and the thickness T of the intermediate transfer belt 3.

The contact member 30 is supported on the roller shaft 6 loosely, that is, without being fastened to the roller shaft 6 and the tension roller 52. Thus, the contact member 30 freely rotates around the same axis as the axis of the tension roller 52 in the XY plane. In this configuration, when the intermediate transfer belt 3 rotates while the belt end portion 3a of the intermediate transfer belt 3 contacts the flat surface 30a of the contact member 30, the contact member 30 is rotated due to frictional force between the contact member 30 and the belt end portion 3a.

As illustrated in FIGS. 2A and 2B, the belt tracking system 50 further includes a belt end support 7 interposed between the axial end of the tension roller 52 and the contact member 30 to prevent the belt end portion 3a from sagging down, for example, due to gravity when the belt end portion 3a separates from the contact portion 30. More specifically, in the present illustrative embodiment, the belt end support 7 is formed of an annular cylinder coaxially mounted on the axis of the tension roller 52. The belt end support 7 has a radius D3 smaller than the radius D2 of the tension roller 52 to create a gap 31a between the adjacent surface of the intermediate transfer belt 3 and the belt end support 7.

It is to be noted that the belt end support 7 may be configured in any suitable regular or irregular geometric shape, including not only cylinders, but also spheres, cubes, and other polygonal prisms, which properly serves its intended function.

As illustrated in FIG. 2A, the slope member 41 is disposed outside and in contact with the contact member 30 in the axial direction of the roller. In other words, the slope member 41 is disposed at the opposite side to the tension roller 52 via the contact member 30.

Figure 3:
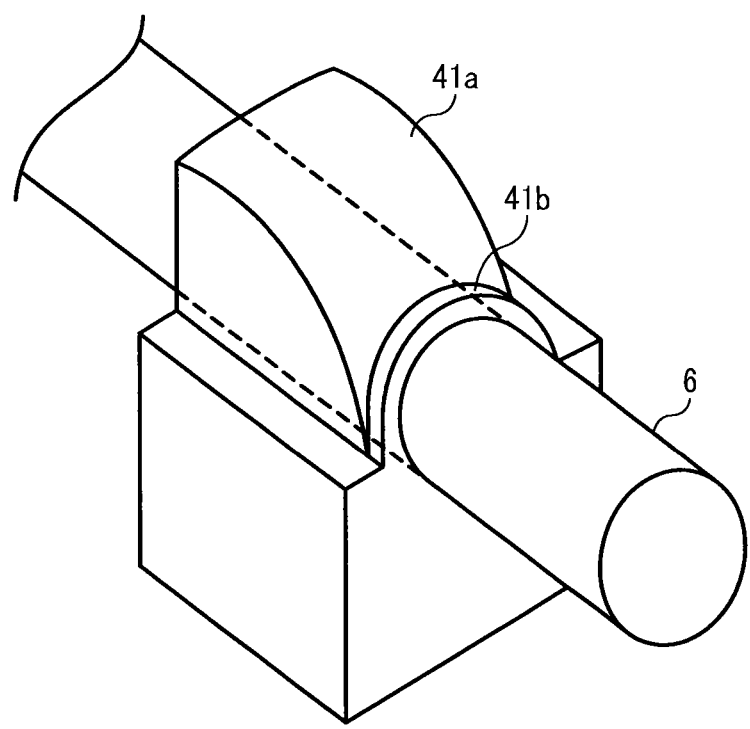
FIG. 3 is a perspective view schematically illustrating a slope member and a roller shaft employed in the belt tracking system of FIGS. 2A and 2B.

The slope member 41 includes a planar, inclined surface 41a sloping toward the roller shaft 6 in the axial direction Z relative to the surface parallel to the belt surface. As illustrated in FIG. 3, the inclined surface 41a of the slope member 41 may be shaped into a spherical surface or a curved surface. Specific examples of the inclined surface 41a include, but are not limited to, a conical surface, a cylindrical surface, a spherical surface, and combinations thereof, which allow the inclined surface 41a to point-contact a guide surface 42a of a shaft guide 42.

Figure 12:
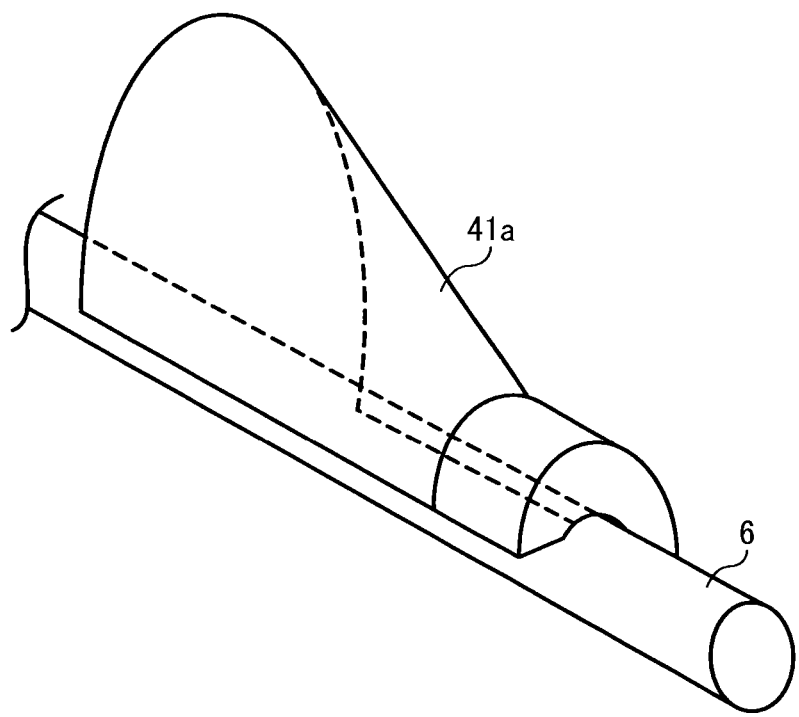
FIG. 12 is a schematic diagram illustrating another example of the slope member.

Alternatively, as illustrated in FIG. 12, the inclined surface 41a may be shaped into a conical surface with its vertex located on the roller axis. Such a configuration maintains a constant angle or orientation at which the slope member 41 contacts the shaft guide 42 during movement of the tension roller 52 and also reduces an area of contact with the shaft guide 42, hence reducing friction relative to the shaft guide 42. Accordingly, the slope member 41 slopes smoothly, thereby reducing loads on the belt end portion 3a and the degree of abrasion as well as the area of abrasion.

Figure 4A:
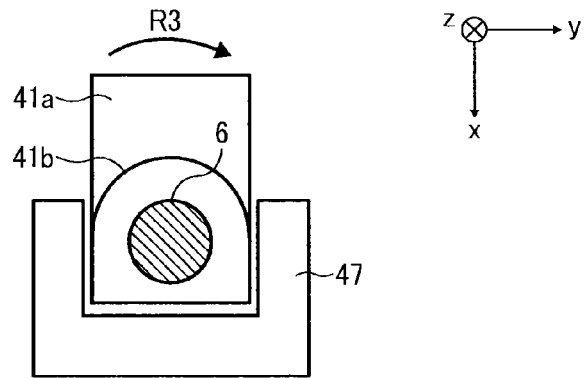
FIGS. 4A through 4C are cross-sectional views schematically illustrating the slope member and a rotation stopper according to an illustrative embodiment of the present disclosure.
Figure 4B:
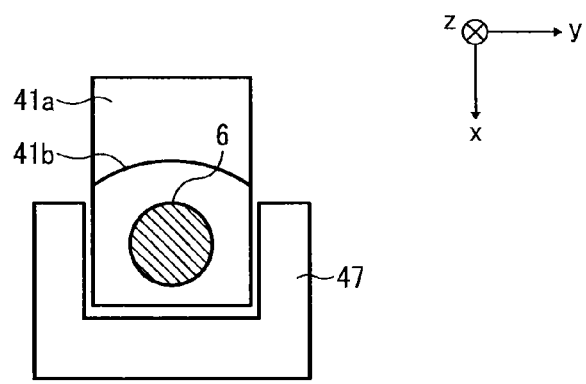
Figure 4C:
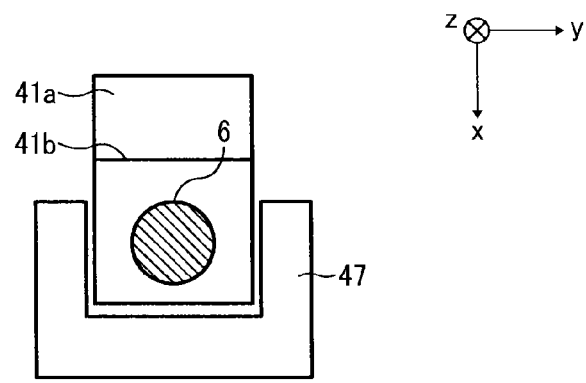

As illustrated in FIG. 3, the slope member 41 includes an inclination stopper 41b disposed substantially at the outward end portion of the inclined surface 41a in the axial direction of the roller. FIGS. 4A through 4C are cross-sectional views schematically illustrating the slope member 41 shown in FIG. 2A as viewed from the axial direction Z. As illustrated in FIGS. 3 and 4A, the inclination stopper 41b is constituted of a portion of a cylinder concentric with the central axis of the roller shaft 6.

Alternatively, as illustrated in FIG. 4B, the inclination stopper 41b may be constituted of a portion of a cylinder, the center of which is different from the central axis of the roller shaft 6, or constituted of a planar surface as illustrated in FIG. 4C.

When employing the inclination stopper 41b with the surface shown in FIG. 4A, an area of contact with the shaft guide 42 is reduced as compared with the configurations shown in FIGS. 4B and 4C, hence reducing abrasion derived from frictional force between the inclination stopper 41b and the shaft guide 42.

The inclined surface 41a and the inclination stopper 41b are made of material having a relatively low friction coefficient, such as polyacetal, which exhibits relatively high wear resistance. The inclined surface 41a is angled at a suitable inclination angle of, for example, approximately 30 degrees relative to the roller shaft 6. In order to prevent excessive load applied to the guide surface 42a by the inclined surface 41a, preferably, the inclination angle of the inclined surface 41a relative to the roller shaft 6 is small. However, too small an inclination angle would result in a large amount of displacement experienced by the slope member 41 for tilting the roller shaft 6, which requires a relatively large space to accommodate displacement of the slope member 41 in the axial direction, adding to the overall size of the belt assembly.

As illustrated in FIG. 2A, the belt tracking system 50 includes the shaft guide 42 disposed outside and in contact with the slope member 41. In other words, the shaft guide 42 is disposed adjacent to and outside the slope member 41 relative to the tension roller 52 in the axial direction Z.

The guide surface 42a of the shaft guide 42 contacts the inclined surface 41a. The shaft guide 42 is fastened so that the shaft guide 42 does not move upon displacement of the slope member 41. With this configuration, as the slope member 41 moves outward in the axial direction of the roller, the inclined surface 41a contacting the guide surface 42a shifts upward, causing the slope member 41 and the roller shaft 6 to tilt. As the roller shaft 6 tilts, the tension roller 52 joined with the roller shaft 6 tilts as well.

Preferably, in the present illustrative embodiment, the guide surface 42a is shaped into a chamfered surface and forms a circular arc in the XZ plane, which is a portion of a cylinder surface. Compared to a sharp cornered edge, the guide surface 42a is superior in preventing abrasion on the inclined surface 41a of the slope member 41.

Because the inclination stopper 41b of the slope member 41 comes into contact with the shaft guide 42, the slope member 41 does not move in the direction of −X axis direction when there is no force exerted by the belt end portion 3a in the axial direction of the roller. Similarly, the slope member 41 (e.g., a slope member 41' in illustrated in FIG. 7A (a)) provided to the other end of the tension roller 52 in the axial direction thereof does not move in the −X axis direction. Accordingly, with the belt tracking system 50, the tension roller 52 is positioned substantially parallel to the Z axis direction (at a predetermined position) as illustrated in FIG. 2A.

During operation, if the tension roller 52 is not parallel to the Z axis direction, the intermediate transfer belt 3 moves in the axial direction of the roller. As the intermediate transfer belt 3 moves in the axial direction of the roller and strikes the contact member 30, the slope member 41 tilts, causing the tension roller 52 to tilt as well. Accordingly, the intermediate transfer belt 3 returns back to the original position.

At this time, in a case in which the tension roller 52 is disposed at the predetermined place at which the tension roller 52 is substantially parallel to the axial direction Z, it does not take long for the tension roller 52 to reach the desired inclination position to bring the intermediate transfer belt 3 back to its original position. By contrast, in a case in which the slope member 41 is not disposed at the predetermined place and the tension roller 52 is tilted, it takes a significant amount of time for the tension roller 52 to reach the desired inclination position to bring the intermediate transfer belt 3 back to its original position. If, in the meantime, the image is formed on the intermediate transfer belt 3, the toner images are not transferred properly one atop the other, resulting in color drift.

Figure 5:
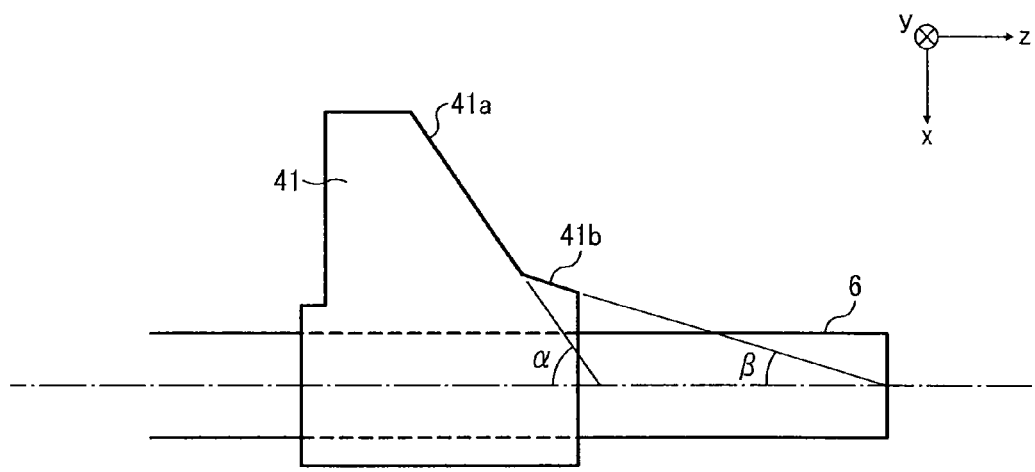
FIG. 5 is a cross-sectional view schematically illustrating another example of the slope member.

With reference to FIG. 5, a description is provided of another example of the slope member 41. In the present illustrative embodiment, the inclination stopper 41b of the slope member 41 is modified. As described above, the inclination stopper 41b shown in FIG. 3 is constituted of a portion of a cylinder concentric with the central axis of the roller shaft 6. By contrast, the inclination stopper 41b shown in FIG. 5 is disposed such that an angle β is formed between the roller shaft 6 and the surface of the cylinder constituting the inclination stopper 41b. In this configuration, the angle β is less than a predetermined angle β between the roller shaft 6 and the surface of the cylinder constituting the inclined surface 41a. With the inclination stopper 41b, the tension roller 52 and the support roller 53 are reliably maintained parallel to each other as compared with the configuration without the inclination stopper 41b.

Figure 6:
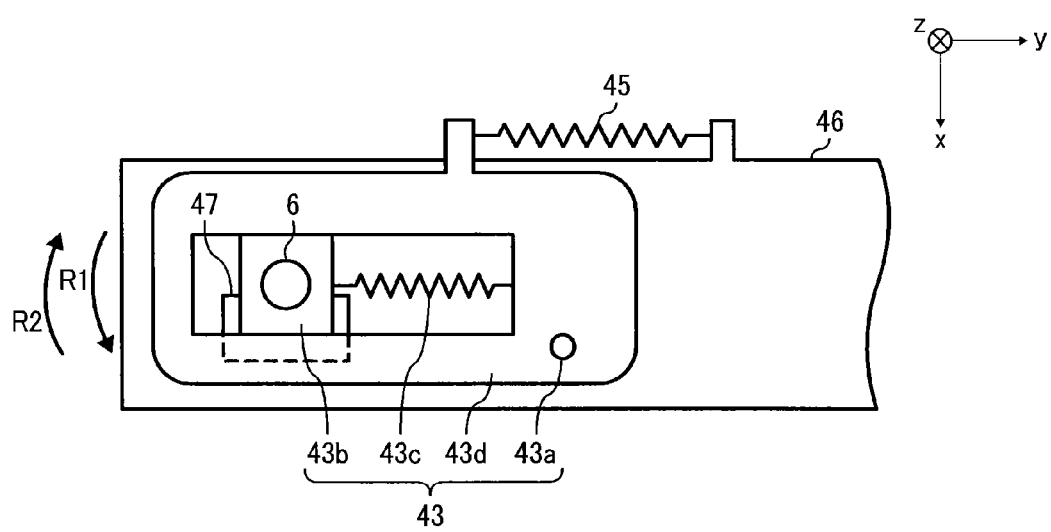
FIG. 6 is a schematic diagram illustrating a roller shaft support according to an illustrative embodiment of the present disclosure.

As illustrated in FIG. 2A, according to the present illustrative embodiment, the belt tracking system 50 includes a stationary support 46 disposed outside the guide member 42 in the axial direction or the Z direction. A roller shaft support 43 is disposed outside the stationary support 46 in the axial direction or the Z direction. With reference to FIG. 6, a description is provided of the roller shaft support 43 and the stationary support 46.

As illustrated in FIG. 6, the roller shaft support 43 includes a hinge or pivot 43a, a tension roller adjuster 43b, an elastic member 43c, and a support board 43d. The support board 43d rotates about the hinge or pivot 43a in a first direction indicated by arrow R1 as the roller shaft 6 moves in the direction perpendicular to the axial direction Z. An elastic member 45 connects the support board 43d and the stationary support 46 which does not move along with movement of the roller shaft 6.

When the support board 43d moves in the first direction R1, the elastic member 45 stretches. With the stretch of the elastic member 45, the resultant elastic force, which opposes the change in length of the elastic member 45, causes the roller shaft support 43 to rotate backward in a second rotational direction R2 opposite the first direction R1 around the hinge or pivot 43a. Accordingly, a force in the axial direction −X acts on the roller shaft 6, pushing the slope member 41 against the shaft guide 42.

With application of the force in the axial direction −X to the roller shaft 6 by the elastic member 45, the roller shaft 6 exerts the force to return the slope member 41 back to its original place. Thus, the elastic member 45 serves as a shaft alignment member.

According to the present illustrative embodiment, the elastic member 45 employs a spring as an example of an elastic member. However, the elastic member 45 is not limited to a spring. Any other suitable elastic members, for example, a leaf spring and rubber may be employed. The stationary support 46 and the shaft guide 42 include a hole that accommodates movement of the roller shaft 6.

The tension roller adjuster 43b is disposed around the roller shaft 6 and connected to the support board 43d and the elastic member 43c. The elastic member 43c applies an elastic force to the tension roller 52 via the tension roller adjuster 43b and the roller shaft 6 such that the tension roller 52 separates from other rollers, thereby stretching the intermediate transfer belt 3. With this configuration, the intermediate transfer belt 3 entrained around the tension roller 52 is kept stretched. The elastic member 43c is an example of an elastic member for stretching the intermediate transfer belt 3. According to the present illustrative embodiment, the elastic member 45 and the elastic member 43c employ a spring as an example of the elastic member. In stead of a spring, any other suitable elastic members such as a leaf spring and rubber may be employed.

Figure 7A:
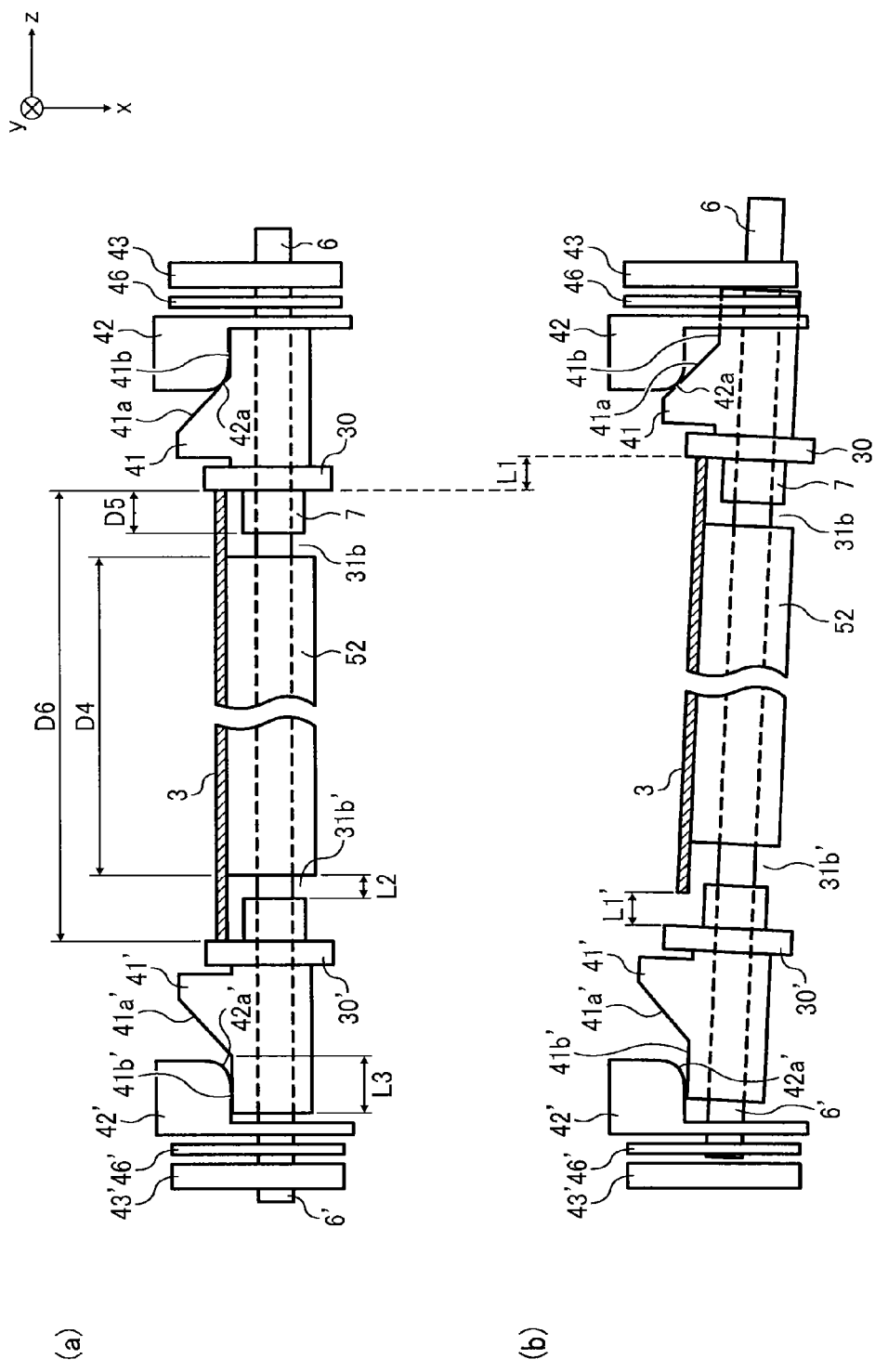
FIGS. 7A through 7C are schematic diagrams illustrating the belt tracking system.

With reference to FIG. 7A (a) and (b), a description is provided of the belt tracking system 50 in which the tension roller 52 is mounted. As shown in FIG. 7A (a) and (b), where L1 is a maximum travel distance of the contact member 30 when the slope member 41 travels a maximum distance toward the end portion as illustrated in FIGS. 7A (a) and 7(b), a maximum travel distance L1' that the intermediate transfer belt 3 can travel toward the contact member 30 coincides with the travel distance L1. The maximum travel distance L1 is a distance between a position at which the slope member 41 is not forced by the intermediate transfer belt 3 as illustrated in FIG. 7A (a) and a position at which the slope member 41 moves in the axial direction and contacts other parts as illustrated in FIG. 7A (b).

It is to be noted that as the slope member 41 moves in the axial direction of the roller, the slope member 41 comes into contact with at least the roller shaft support 43 as an example of other parts that the slope member 41 contacts. The parts that the slope member 41 may contact include, but are not limited to, the shaft guide 42 and the stationary support 46. In this case, the maximum travel distance L1 is between the position at which the slope member 41 is not forced by the intermediate transfer belt 3 and the position at which the slope member 41 moves in the axial direction and comes into contact with other parts.

The slope member 41 is illustrated in an exaggerated manner for convenience in FIG. 7A (a) and (b). The slope member 41 is configured such that the slope member 41 can penetrate through the holes in the shaft guide 42 and the stationary support 46, and contact the roller shaft support 43.

Figure 7B:
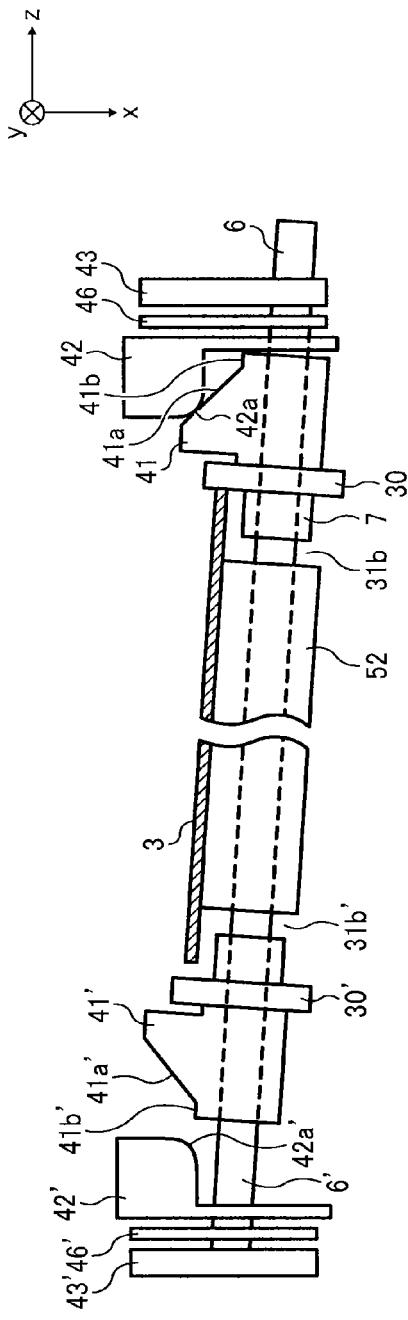

As illustrated in FIG. 7A (a), where L3 is a length of the inclination stopper 41b in the axial direction of the roller, L3 is configured to be substantially longer than the distance L1. When the intermediate transfer belt 3 travels toward the contact member 30 as illustrated in FIG. 7A (b), a gap is formed between the intermediate transfer belt 3 and an opposed contact member 30' at the opposed side of the contact member 30 in the axial direction, causing a possibility of moving the opposed contact member 30' and an opposed slope member 41' in the axial direction toward the contact member 30. Where the length L3 is equal to or less than the distance L1, an inclination stopper 41b' disposed at the opposed side of the inclination stopper 41 may separate from a shaft guide 42' as illustrated in FIG. 7B.

By contrast, with the length L3 being substantially longer than the distance L1, as illustrated in FIG. 7A (b), a portion of the inclination stopper 41b' can remain in contact with the shaft guide 42'. With this configuration, in a case in which the intermediate transfer belt 3 moves toward the contact member 30', the slope member 41' can return easily to the state in which an inclined surface 41a' contacts the shaft guide 42', hence properly tilting the roller shaft 6.

Referring back to FIG. 2A, a description is provided of a gap, i.e., a gap 31b between the tension roller 52 and the belt end support 7. According to the present illustrative embodiment, the gap 31b is formed between the tension roller 52 and the belt end support 7. Due to wear and tear of parts over time, the tension roller 52 may move in the axial direction of the roller and force the slope member 41, tilting undesirably the slope member 41 even when the intermediate transfer belt 3 does not move in the axial direction of the roller.

The gap 31b is provided between the tension roller 52 and the belt end support 7 to prevent undesirable force applied to the slope member 41 even when the tension roller 52 moves in the axial direction. More specifically, where D4 is a length of the tension roller 52 in the axial direction as illustrated in FIG. 7A (a), D5 is a length of the belt end support member 7 in the axial direction, and D6 is a distance between the contact portion 30 disposed at one end of the tension roller 52 and the contact portion 30' at the opposed end, the distance D6 is longer than D4+D5×2 to form the gap 31b.

A maximum length L2 of the gap 31b in the axial direction satisfies the following relation:

$$L2=D6-(D4+D5\times 2).$$

The length L3 of the inclination stopper 41b in the axial direction is longer than the length L2 of the gap 31b'. Because there is the gap 31b' as illustrated in FIG. 7A (a), the contact portion 30' and the slope member 41' may move toward the contact portion 30 at the opposed side.

In a case in which the length L3 is shorter than the length L2 of the gap, the inclined surface 41a' and the inclination stopper 41b' of the slope member 41' separate from the shaft guide 42' as illustrated in FIG. 7B. By contrast, with the length L3 being equal to or longer than the length L2, a portion of the inclination stopper 41b' can remain in contact with the shaft guide 42' as illustrated in FIG. 7A (b). In other words, when the intermediate transfer belt 3 moves toward the contact member 30', the slope member 41' can return easily to the state in which the inclined surface 41a' contacts the shaft guide 42', hence properly tilting the roller shaft 6.

Figure 7C:
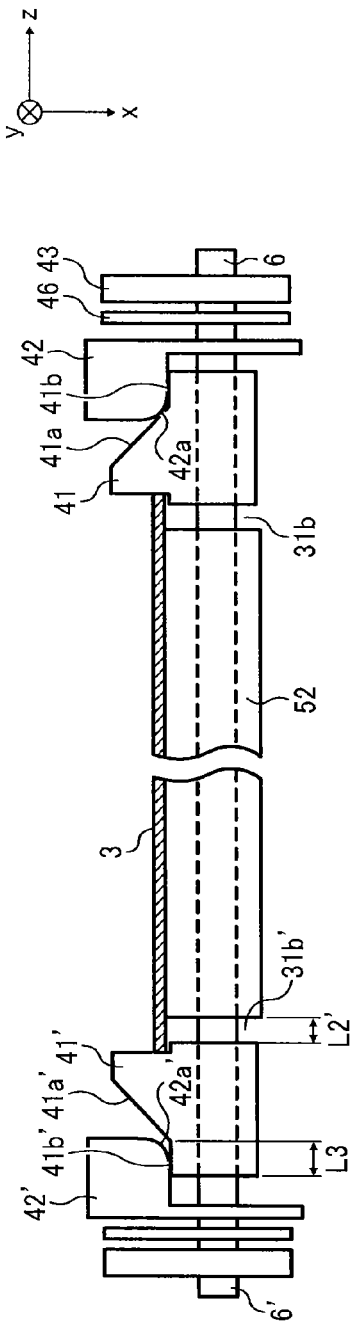

The belt end support 7 and the contact member 30 are not necessarily essential parts to move the roller shaft 6 properly. For example, as illustrated in FIG. 7C, the belt end support 7 and the contact member 30 can be eliminated. Alternatively, the intermediate transfer belt 3 may directly apply a force in the axial direction to the slope member 41. In this case, the length L3 of the inclination stopper 41b' in the axial direction is configured to be longer than a length L2' of the gap 31b' in the axial direction between the tension roller 52 and the slope member 41'.

The above description relates to the length L3 of the inclination stopper 41b when the slope member 41 includes the inclination stopper 41b. With reference to FIG. 8 (a) and (b), a description is provided of the slope member 41 without the inclination stopper 41b according to another illustrative embodiment of the present disclosure. As illustrated in FIG. 8 (a), a length L4 between a contact point at which the inclined surface 41a' of the slope member 41' contacts the guide surface 42a' and an end surface of the slope member 41' outward from the contact point may be longer than the distance L1 and the length L2 of the gap.

In this case, even when the intermediate transfer belt 3 moves toward the contact member 30 and hence a gap is formed between the intermediate transfer belt 3 and the contact member 30' at the opposed side, hence causing the contact member 30' and the slope member 41' to move inward (toward the contact member 30 at the opposite side), the inclined surface 41a' is prevented from getting separated from the shaft guide 42'.

With reference to FIGS. 4A through 4C, a description is provided of a rotation stopper 47 employed in the belt tracking system 50 according to an illustrative embodiment of the present disclosure. FIGS. 4A through 4C are cross-sectional views schematically illustrating the slope member 41 and the rotation stopper 47 as viewed from the axial direction Z.

The rotation stopper 47 stops rotation of the slope member 41. As illustrated in FIG. 4A, the rotation stopper 47 has a substantially U-shaped cross section which surrounds the slope member 41 along the lateral surface and the bottom surface thereof. The rotation stopper 47 is attached to the fixed roller shaft support 43 so that the rotation stopper 47 does not rotate in the XY plane. Thus, even when the slope member 41 receives a force that causes the slope member 41 to rotate in the direction indicated by arrow R3 in the XY plane as illustrated in FIG. 4A, the slope member 41 is prevented from rotating.

It is to be noted that movement of the rotation stopper 47 and the slope member 41 in the direction Z is not restricted.

Furthermore, as long as the rotation stopper 47 can stop the rotation of the slope member 41, the shape of the rotation stopper 47 is not limited to the shapes shown in FIGS. 4A through 4C.

Figure 9A:
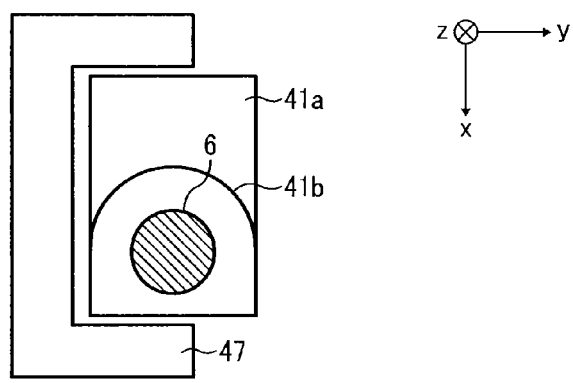
FIGS. 9A through 9C are cross-sectional views schematically illustrating variations of the rotation stopper.
Figure 9B:
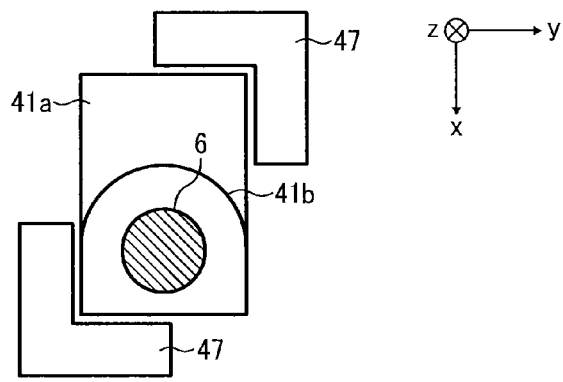
Figure 9C:
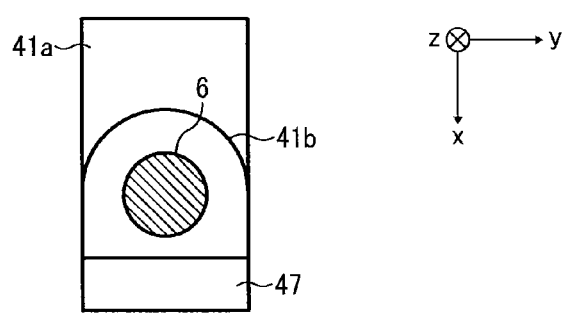
Figure 13:
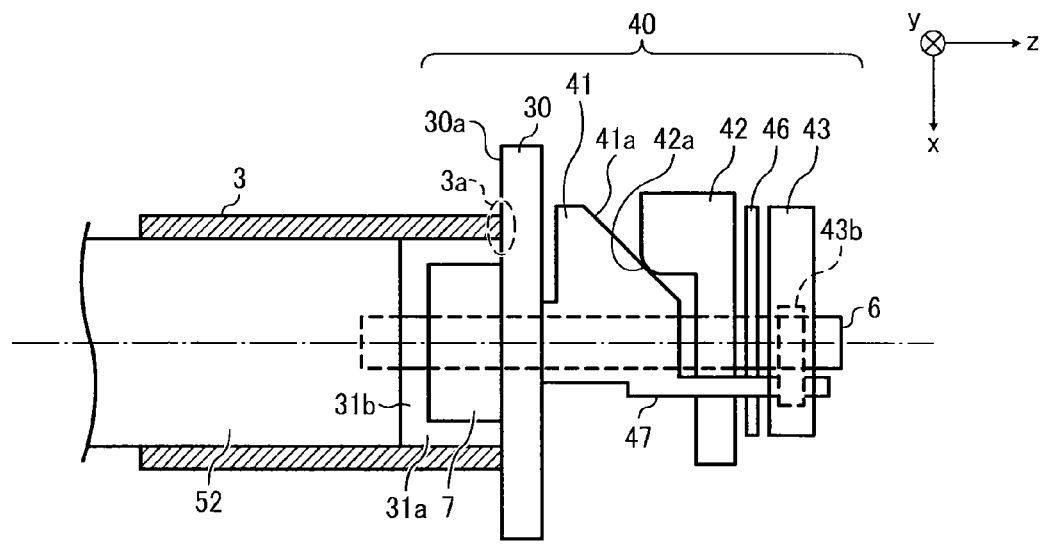
FIG. 13 is a cross-sectional view schematically illustrating the belt tracking system according to another illustrative embodiment of the present disclosure.
Figure 14:
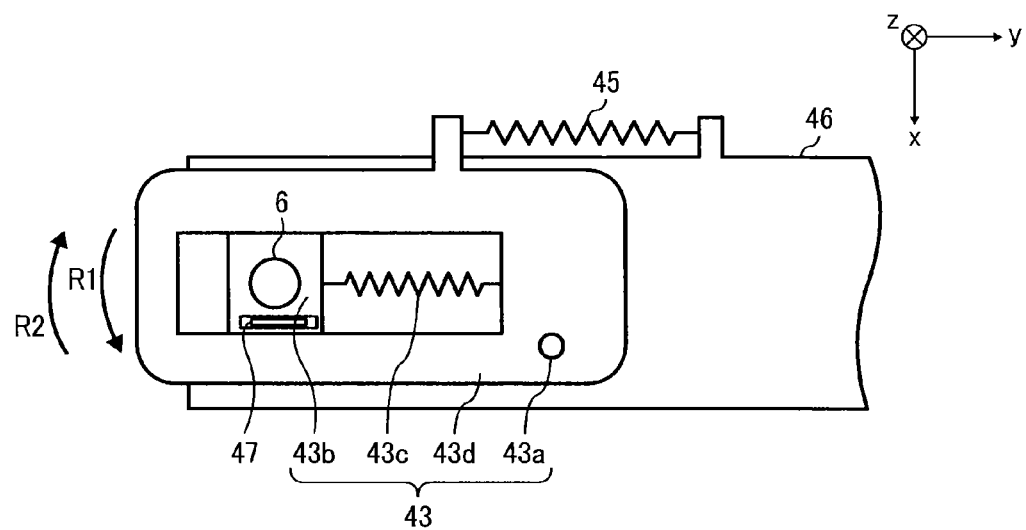
FIG. 14 is a schematic diagram illustrating the rotation stopper employed in the belt tracking system of FIG. 13.

With reference to FIGS. 9A through 9C, a description is provided of variations of the rotation stopper 47. For example, the rotation stopper 47 may have shapes illustrated in FIGS. 9A and 9B. The rotation stopper 47 may be attached to the slope member 41 as illustrated in FIG. 9C. Alternatively, a portion of the slope member 41 may serve as the rotation stopper 47. In this case, as illustrated in FIGS. 13 and 14, the portion of the rotation stopper 47 may, for example, slide along the hole in the tension roller adjuster 43b, thereby stopping the rotation of the slope member 41 without hindering the movement of the roller shaft 6.

The rotation stopper 47 is not necessarily attached to the tension roller adjuster 43b. Alternatively, the rotation stopper 47 may be attached to a portion of the roller shaft support 43, other than the tension roller adjuster 43b, moving in association with the movement of the roller shaft 6. As mentioned above, the contact member 30 rotates in association with rotation of the intermediate transfer belt 3. However, if the contact member 30 is disposed so as not to rotate, the rotation stopper 47 may be attached to the contact member 30.

The tension roller 52, the roller shaft 6, the contact member 30, the position adjuster 40 constitute a roller unit. The slope member 41, the shaft guide 42, the roller shaft support 43, the stationary support 46, and the elastic member 45 shown in FIG. 6 constitute the belt position adjuster 40.

Next, a description is provided of operation of the belt tracking system 50 according to an illustrative embodiment of the present disclosure. As the drive roller 51 is rotated by the drive source, the rotation of the drive roller 51 causes the intermediate transfer belt 3 to rotate in the direction of arrow Y (hereinafter referred to as traveling direction) shown in FIG. 2A. The tension roller 52 about which the intermediate transfer belt 3 is entrained is rotated accordingly. At this time, the intermediate transfer belt 3 may drift in the axial direction of the roller when the plurality of rollers is not parallel to each other. As the intermediate transfer belt 3 moves in the axial direction and the belt end portion 3a strikes the flat surface 30a, the intermediate transfer belt 3 moves in its traveling direction while the belt end portion 3a keeps forcing the contact member 30 outward in the axial direction.

With reference to FIGS. 2A, 2B, 10A, and 10B, a description is provided of movement of the intermediate transfer belt 3 in the axial direction. For simplicity, the movement of the intermediate transfer belt 3 is explained with respect to the tension roller 52 and the support roller 53 around which the intermediate transfer belt 3 is entrained.

Figure 10A:
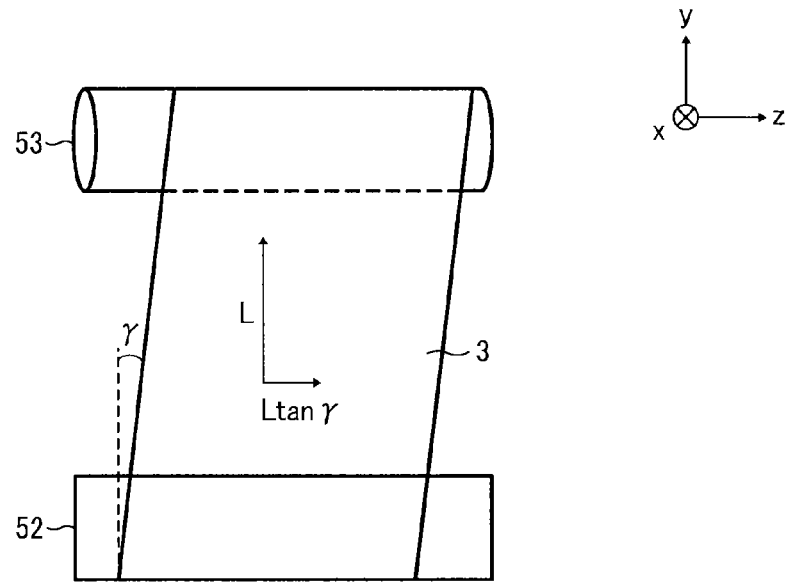
FIGS. 10A and 10B are schematic plan views illustrating a belt entrained around rollers.
Figure 10B:
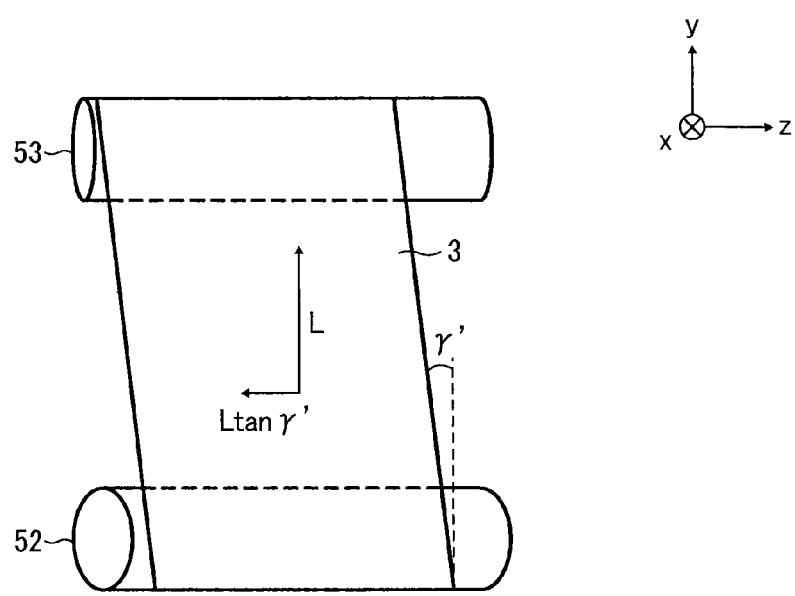
Figure 11A:
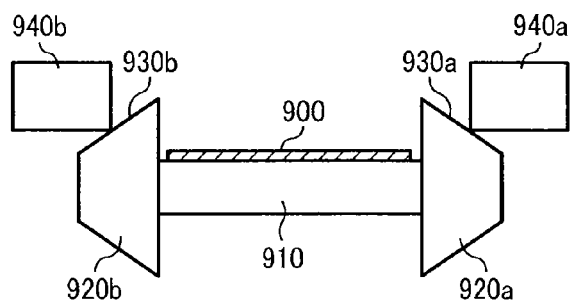
FIGS. 11A through 11D are schematic diagrams illustrating a related-art belt tracking system.
Figure 11B:
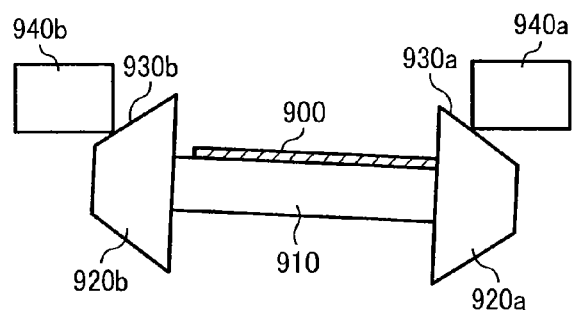
Figure 11C:
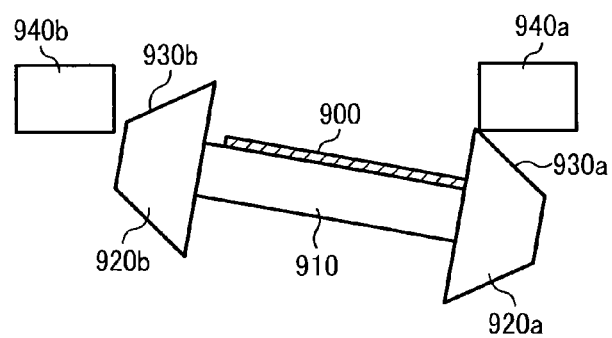
Figure 11D:
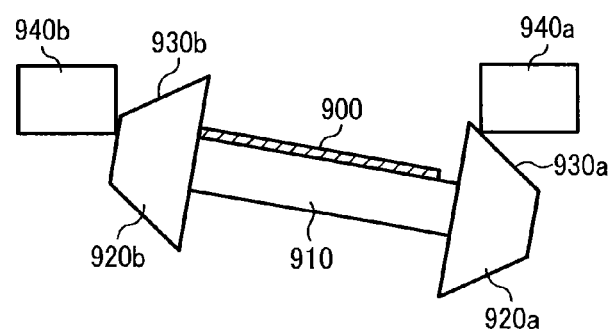

FIGS. 10A and 10B are schematic plan views illustrating the intermediate transfer belt 3 entrained around the tension roller 52 and the support roller 53. As illustrated in FIGS. 10A and 10B, the intermediate transfer belt 3 is entrained around the tension roller 52 and the support roller 53, and the tension roller 52 and the support roller 53 are not parallel. More specifically, in FIG. 10A, the tension roller 52 is parallel with respect to a plane of the drawing, and the support roller 53 is tilted such that the left end portion of the support roller 53 is at the proximal side toward the viewer on the plane of the drawing in the axial direction X and the right end side is substantially at a distal side.

In a case in which the shaft of the tension roller 52 and the shaft of the support roller 53 are not parallel to each other, causing the intermediate transfer belt 3 to tilt at an angle γ relative to the traveling direction thereof, the intermediate transfer belt 3 moves by a distance L tan γ in the direction +Z (i.e., to the right side in FIG. 10A) after the intermediate transfer belt 3 moves by the distance L.

When the intermediate transfer belt 3 shifts in the axial direction and strikes the contact member 30, the slope member 41 moves outward in the axial direction, causing the roller shaft 6 and the tension roller 52 to tilt.

As illustrated in FIG. 2A, when the belt end portion 3a contacts the flat surface 30a of the contact portion 30, the contact portion 30 moves outward in the axial direction (+Z direction), thereby exerting a force to the slope member 41 outward in the axial direction of the roller. Consequently, as the slope member 41 moves outward in the axial direction of the roller due to the force, the inclined surface 41a contacting the guide surface 42a of the shaft guide 42 shifts upward and tilts as illustrated in FIG. 2B. With the inclination of the slope member 41, the end portion of the roller shaft 6 penetrating through the slope member 41 moves in the +X direction (the downward direction in FIG. 2B).

As the end portion of the roller shaft 6 moves in the +X direction, the tension roller 52 through which the roller shaft 6 penetrates tilts. FIG. 10B illustrates the inclined tension roller 52 of FIG. 2B as viewed from the axial direction X. As illustrated in FIG. 10B, the tension roller 52 is inclined with the left end portion thereof closer to the proximal side than the left end portion in the axial direction X in the drawing. When the degree of inclination of the tension roller 52 is greater than that of the support roller 53, the tension roller 52 and the support roller 53 form an opposite inclination relative to the inclination shown in FIG. 10A. In this case, the intermediate transfer belt 3 moves in the −Z direction (to the left in FIG. 10B), returning to the original position.

More specifically, as illustrated in FIG. 10B, in a case in which the traveling direction of the intermediate transfer belt 3 shifts by an angle γ' due to the tension roller 52 being inclined, as the intermediate transfer belt 3 travels a distance L, the intermediate transfer belt 3 moves by an amount L tan γ' in the −Z direction, which is the direction opposite to the above-described operation. In other words, the intermediate transfer belt 3 entrained around the tension roller 52 returns inward in the axial direction, returning to its original position.

Because the gap 31b is formed between the tension roller 52 and the belt end support 7 as illustrated in FIGS. 2A and 2B, even when the tension roller 52 drifts in the axial direction of the roller due to backlash or play (dimensional variations of parts), the tension roller 52 and the belt end support 7 remain spaced apart. Accordingly, the tension roller 52 is prevented from forcing the contact member 30 and the slope member 41 outward in the axial direction via the belt end support 7. Only with the force generated by the belt end portion 3a contacting the contact member 30, the roller shaft 6 can be tilted.

In other words, in a case in which the intermediate transfer belt 3 moves outward significantly in the axial direction, the force applied to the contact member 30 by the belt end portion 3a is relatively large, thereby increasing the angle γ' by which the roller shaft 6 is inclined and hence increasing the distance L tan γ' that the intermediate transfer belt 3 travels inward in the axial direction. By contrast, in a case in which the displacement of the intermediate transfer belt 3 outward in the axial direction is relatively small, the force applied to the contact member 30 by the belt end portion 3a is relatively small, thereby reducing the angle γ' by which the roller shaft 6 is inclined and hence shortening the distance L tan γ' that the intermediate transfer belt 3 travels inward in the axial direction.

With this configuration, depending on the amount of displacement of the intermediate transfer belt 3 outward in the axial direction, the distance by which the intermediate transfer roller 3 moves inward in the axial direction is determined and hence the alignment of the intermediate transfer belt 3 is corrected properly.

According to the present illustrative embodiment, when the outward force in the axial direction (Z direction) of the roller is exerted to the slope member 41, thereby moving the end portion of the roller shaft 6 in the axial direction X, the roller shaft support 43 rotates about the hinge or pivot 43a in the first direction R1 shown in FIG. 6. With the inclination of the roller shaft support 43, the elastic member 45 is stretched. With the stretch of the elastic member 45, the resultant elastic force, which opposes the change in length of the elastic member 45, causes the roller shaft support 43 to rotate backward in the second direction R2 opposite the first direction R1 around the hinge or pivot 43a. As a result, the roller shaft 6 covered by the roller shaft support 43 moves upward. The slope member 41 does not separate from the shaft guide 42 under its own weight and the inclined surface 41a of the slope member 41 remains in contact with the guide surface 42a of the shaft guide 42.

Rotation of the tension roller 52 causes the roller shaft 6 connected thereto to rotate, which causes the slope member 41 to rotate due to the frictional force generated by the slope member 41 contacting the roller shaft 6. Furthermore, the slope member 41 may get rotated due to the frictional force when contacting the contact member 30.

When the slope member 41 rotates in the direction of rotation of the roller shaft 6, the inclined surface 41a of the slope member 41 moves while contacting the guide surface 42a, hence worsening abrasion compared with the case in which the slope member 41 does not rotate. In view of this, according to the illustrative embodiment described above, even when the frictional force acts on the slope member 41 to rotate in the direction R3 in the X-Y plane as illustrated in FIG. 4A, the slope member 41 contacts the rotation stopper 47 and stops rotating.

The rotation stopper 47 can prevent rotation of the slope member 41 in association with rotation of the roller shaft 6, thereby reducing abrasion of the slope member 41 and the shaft guide 42 at the contact point. With this configuration, damage to the slope member 41 and the shaft guide 42 is reduced, hence reliably moving the intermediate transfer belt 3 and extending the product life of the parts.

With reference to FIGS. 7A through 7C, a description is provided of the belt tracking system 50 mounted in the image forming apparatus 100. As described above, the slope member 41 moves in the axial direction X while contacting the guide surface 42a. Thus, if the inclination stopper 41b is not provided, there is a possibility that the roller shaft 6 is not parallel with the axis Z as illustrated in FIG. 8 (b).

In view of the above, as illustrated in FIG. 7A (1), the slope member 41 includes the inclination stopper 41b, and the slope member 41' includes the inclination stopper 41b', thereby reliably maintaining the roller shaft 6 parallel to the Z axis. More specifically, when the belt tracking system 50 is mounted in the image forming apparatus 100, the image forming apparatus 100 is not operating. For this reason, the force in the Z direction does not act on the slope members 41 and 41'. In this state, when the belt tracking system 50 is mounted, the inclination stopper 41b contacts the curved-shape bottom surface of the shaft guide 42, thereby preventing the slope member 41 from moving in the −X axis direction.

Similarly, the inclination stopper 41b' does not move in the +X axis direction. The inclination stopper 41b' of the slope member 41' contacts the curved-shape bottom surface of the shaft guide 42', thereby preventing the slope member 41' from moving in the −X axis direction. Accordingly, the inclination stopper 41b' does not move in the +X axis direction.

As a result, the substantially curved-shape bottom surfaces of the shaft guides 42 and 42' contact reliably the respective inclination stoppers 41b and 41b', thereby allowing the roller shafts 6 and 6' and the tension roller 52 joined with the roller shafts 6 and 6' to be aligned parallel with the Z axis reliably. When the image forming apparatus 100 is activated and the force in the axial direction Z acts on the slope member 41, the roller shafts 6 and 6', and the tension roller 52 tilt as illustrated in FIG. 7A (b).

With the inclination stoppers 41b and 41b' provided to the slope member 41 and 41' at each end of the tension roller 52, displacement of the intermediate transfer belt 3 in the axial direction of the roller when the roller shaft 6 is not parallel with the Z axis is prevented upon start of operation of the image forming apparatus 100. In a case in which the operation of the image forming apparatus 100 starts with the tension roller 52 being parallel with the Z axis as illustrated in FIG. 7A (a), only a small amount of correction is needed for the tension roller 52 until the slope member 41 and the roller shaft 6 tilt when correcting displacement of the intermediate transfer belt 3 in the axial direction of the roller, as compared with starting the operation of the image forming apparatus 100 with the tension roller 52 being not parallel with the Z axis as illustrated in FIG. 7B. As compared with a large amount of roller movement, the displacement of the intermediate transfer belt 3 in the traveling direction is corrected within a short period of time, thereby reducing imaging failure before the displacement is corrected.

A similar or the same belt tracking system as the belt tracking system 50 may be applied to the support roller 53 adjacent to the tension roller 52 to keep reliably the support roller 53 parallel to the Z axis. Accordingly, the tension roller 52 and the support roller 53 are disposed parallel with each other reliably.

The rollers other than the tension roller 52, such as the drive roller 51, the support roller 53, and the support roller 54 in the belt unit do not apply tension to the intermediate transfer belt 3. Thus, the tension roller adjuster 43b and the spring 43 are not necessary.

In addition to the tension roller 52, the belt tracking system 50 may be provided to the end portions of two or more rollers such as the support roller 53 and the support roller 54.

According to the illustrative embodiments, the inclined surface 41a of the slope member 41 slopes toward the roller shaft 6 or slopes in the axial direction Z relative to the parallel plane of the belt surface. For example, the inclined surface 41a is disposed at an upper side of the shaft of the tension roller 52 and slopes downward toward the roller shaft 6. Alternatively, instead, the inclined surface 41a may be disposed substantially below the roller shaft 6 of the tension roller 52 and slopes upward toward the roller shaft 6.

According to the illustrative embodiments, when the intermediate transfer belt 3 moves in its traveling direction with the belt end portion 3a contacting the flat surface 30a of the contact member 30, the contact member 30 is rotated in association with the movement of the intermediate transfer belt 3 due to frictional force between the belt end portion 3a and the flat surface 30a. With this configuration, the load acting on the belt end portion 3a due to the frictional force is reduced, thereby preventing damage or wear and tear of the intermediate transfer belt 3 and the flat surface 30a.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A belt tracking system for adjusting misalignment of a movable belt in an axial direction of a plurality of rollers about which the movable belt is entrained, the belt tracking system comprising:
a slope member disposed at both ends of at least one of the plurality of rollers in the axial direction, to tilt the roller as the belt moves in the axial direction; and
a stationary shaft guide to contact the slope member,
wherein a distance between a contact point of the slope member that contacts the stationary shaft guide and an end portion of the slope member in the axial direction is longer than a maximum traveling distance that the slope member travels in the axial direction.

2. The belt tracking system according to claim 1, wherein the maximum travel distance is a distance between a position at which the slope member contacts an object as the slope member is moved in the axial direction by a force exerted by the belt and a position at which the slope member is not forced by the belt.

3. A belt tracking system for adjusting misalignment of a movable belt in an axial direction of a plurality of rollers about which the movable belt is entrained, the belt tracking system comprising:
a slope member disposed at both ends of at least one of the plurality of rollers in the axial direction, to tilt the roller as the belt moves in the axial direction;
a stationary shaft guide to contact the slope member; and
a gap disposed between the roller and the slope member,
wherein a distance between a contact point of the slope member that contacts the stationary shaft guide and an end portion of the slope member in the axial direction is greater than a length of the gap.

4. The belt tracking system according to claim 1, wherein the slope member includes an inclination stopper disposed between the contact point and the end portion of the slope member, and the inclination stopper contacts the stationary shaft guide to stop the slope member from tilting.

5. The belt tracking system according to claim 4, wherein the stationary shaft guide includes a surface parallel to the surface of the belt, the slope member includes an inclined surface inclined relative to the surface of the belt, to contact the stationary shaft guide, and an end portion of the inclined surface includes the inclination stopper constituted of a portion of a cylinder concentric with a central axis of a roller shaft.

6. The belt tracking system according to claim 5, wherein a contact portion of the stationary shaft guide contacting the inclined surface is constituted of a portion of a surface of a cylinder.

7. A roller assembly for supporting a movable belt in place, comprising:
a plurality of rollers about which the movable belt is entrained to rotate the movable belt in a direction perpendicular to an axial direction of the plurality of rollers;
a slope member disposed on both ends of at least one of the plurality of rollers in the axial direction, to tilt the roller as the belt moves in the axial direction; and
a stationary shaft guide to contact the slope member,
wherein a distance between a contact point of the slope member that contacts the stationary shaft guide and an end portion of the slope member in the axial direction is longer than a maximum traveling distance that the slope member travels in the axial direction.

8. An image forming apparatus, comprising:
the belt tracking system according to claim 1.

9. An image forming apparatus, comprising:
a plurality of rollers; and
the belt tracking system according to claim 1,
wherein the belt tracking system is disposed at both ends of two or more rollers in the axial direction.

10. An image forming apparatus, comprising:
the roller assembly according to claim 7.

11. The belt tracking system according to claim 1, wherein the slope member is disposed in constant direct contact with the stationary shaft guide.

12. The belt tracking system according to claim 1, wherein the slope member includes a nonsymmetrical shape about a central axis of the roller.

* * * * *